(12) United States Patent
Kim

(10) Patent No.: US 11,995,352 B2
(45) Date of Patent: May 28, 2024

(54) MEMORY CONTROLLER AND OPERATING METHOD THEREOF

(71) Applicant: SK hynix Inc., Gyeonggi-do (KR)

(72) Inventor: Ki Young Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 17 days.

(21) Appl. No.: 17/746,304

(22) Filed: May 17, 2022

(65) Prior Publication Data

US 2023/0205458 A1 Jun. 29, 2023

(30) Foreign Application Priority Data

Dec. 24, 2021 (KR) .................. 10-2021-0186786

(51) Int. Cl.
*G06F 3/06* (2006.01)
*H04L 67/1097* (2022.01)

(52) U.S. Cl.
CPC .......... *G06F 3/0659* (2013.01); *G06F 3/0607* (2013.01); *G06F 3/0658* (2013.01); *G06F 3/0679* (2013.01); *H04L 67/1097* (2013.01)

(58) Field of Classification Search
CPC .... G06F 3/0659; G06F 3/0607; G06F 3/0658; G06F 3/0679; H04L 67/1097; H04L 67/1095; H04L 67/1001
See application file for complete search history.

(56) References Cited

U.S. PATENT DOCUMENTS

2021/0185124 A1* 6/2021 Surcouf ............. H04L 67/1097

FOREIGN PATENT DOCUMENTS

KR 10-2021-0004502 A 1/2021
KR 10-2021-0111993 A 9/2021

* cited by examiner

*Primary Examiner* — Ernest Unelus
(74) *Attorney, Agent, or Firm* — IP & T GROUP LLP

(57) ABSTRACT

The embodiments of the present disclosure relate to a memory controller and operating method thereof. According to embodiments of the present disclosure, the memory controller may include a memory configured to store an activation candidate list including one or more nodes each indicating a logical address range that satisfies a preset activation candidate condition, and a processor configured to determine a target node based on activation parameters of logical address ranges indicated by respective nodes included in the activation candidate list, determine, as activation logical address ranges, one or more logical address ranges from the activation candidate list based on the target node, and transmit information indicating the activation logical address range to a host.

20 Claims, 20 Drawing Sheets

Overwrite

Delete

MEMORY CONTROLLER AND OPERATING METHOD THEREOF

CROSS-REFERENCES TO RELATED APPLICATION

The present application claims priority under 35 U.S.C. 119(a) to Korean patent application number 10-2021-0186786 filed on Dec. 24, 2021, which is incorporated herein by reference in its entirety.

TECHNICAL FIELD

The embodiments of the present disclosure relate to a memory controller and operating method thereof.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

The memory system may transmit mapping information between logical addresses and physical address to the host to quickly process a command, e.g. a read command or a write command, received from the host. In this case, the host may include information on a physical address mapped to a specific logical address in the command.

SUMMARY

Embodiments of the present disclosure may provide a memory controller and operating method thereof, capable of providing mapping information between a logical address and a physical address that the host is likely to refer to.

Embodiments of the present disclosure may also provide a memory controller and operating method thereof, capable of processing commands received from the host faster.

In one aspect, an embodiment of the present disclosure may provide a memory controller comprising a memory configured to store an activation candidate list including one or more nodes each indicating a logical address range that satisfies a preset activation candidate condition among a plurality of logical address ranges and a processor configured to determine a target node based on an activation parameter of logical address ranges indicated by respective nodes included in the activation candidate list, determine, as activation logical address ranges, one or more logical address ranges from the activation candidate list based on the target node, and transmit information indicating the activation logical address range to a host.

In another aspect, an embodiment of the present disclosure may provide an operating method of a memory controller including determining a target node based on an activation parameters of logical address ranges indicated by respective nodes included in an activation candidate list including one or more nodes each indicating a logical address range that satisfies a preset activation candidate condition among a plurality of logical address range, determining, as activation logical address ranges, one or more logical address ranges from the activation candidate list based on the target node, and transmitting information indicating the activation logical address range to a host.

According to embodiments of the present disclosure, it is possible to provide a memory controller and operating method thereof, capable of providing mapping information between a logical address and a physical address that the host is likely to refer to and to process a command received from the host faster.

DETAIL DESCRIPTION

Figure 1:
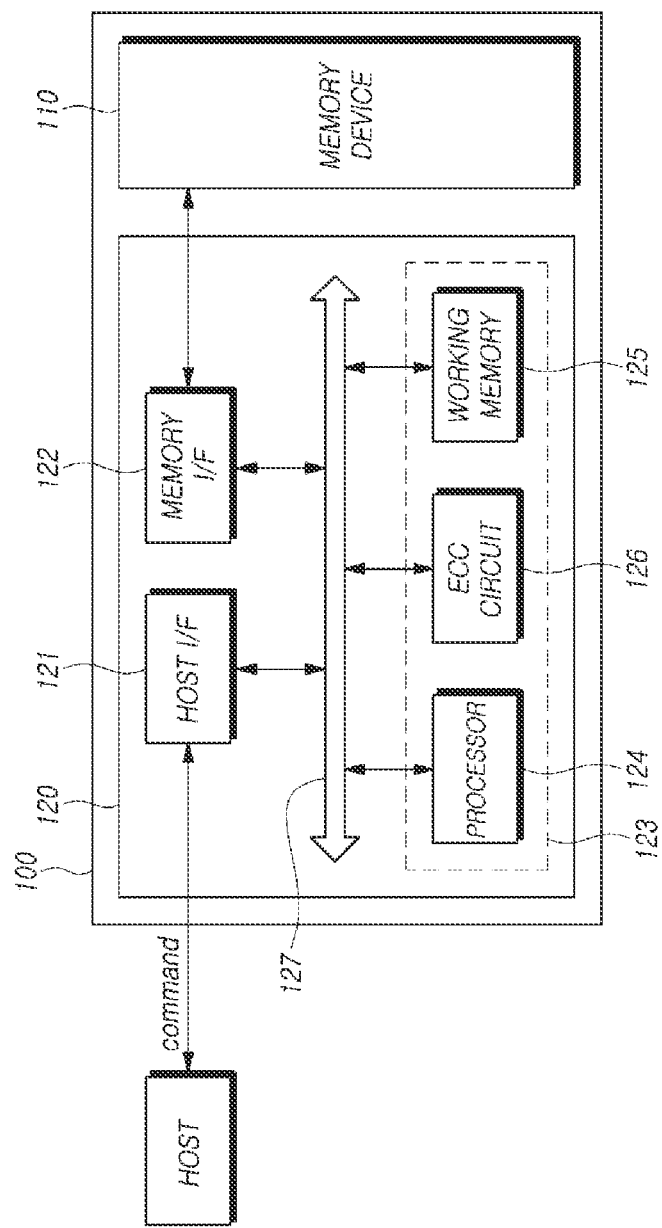
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device are described in detail, the code or instructions for implementing the operations of the method embodiments may transform the computer, processor, controller, or other signal processing device into a special-purpose processor for performing the methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation also referred to as a "write operation", an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operations may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of a request from the host when it performs such background operations on the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
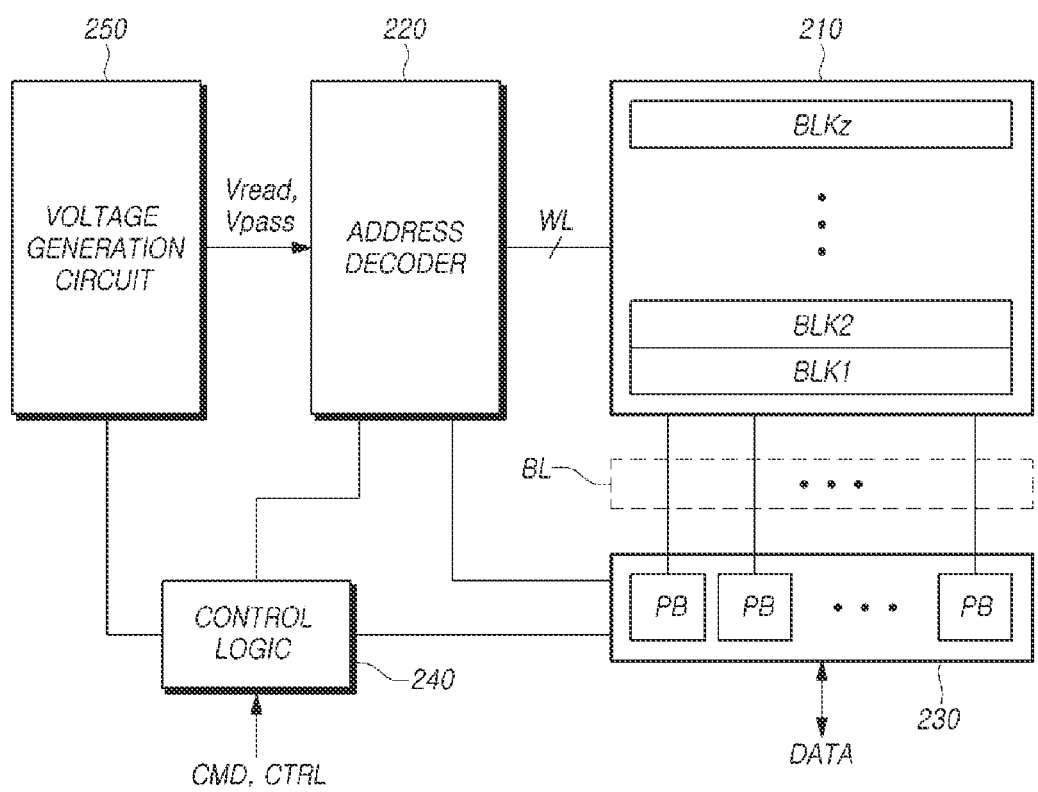
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of the word lines WL, and each of the memory cell strings STR is coupled to one of the bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
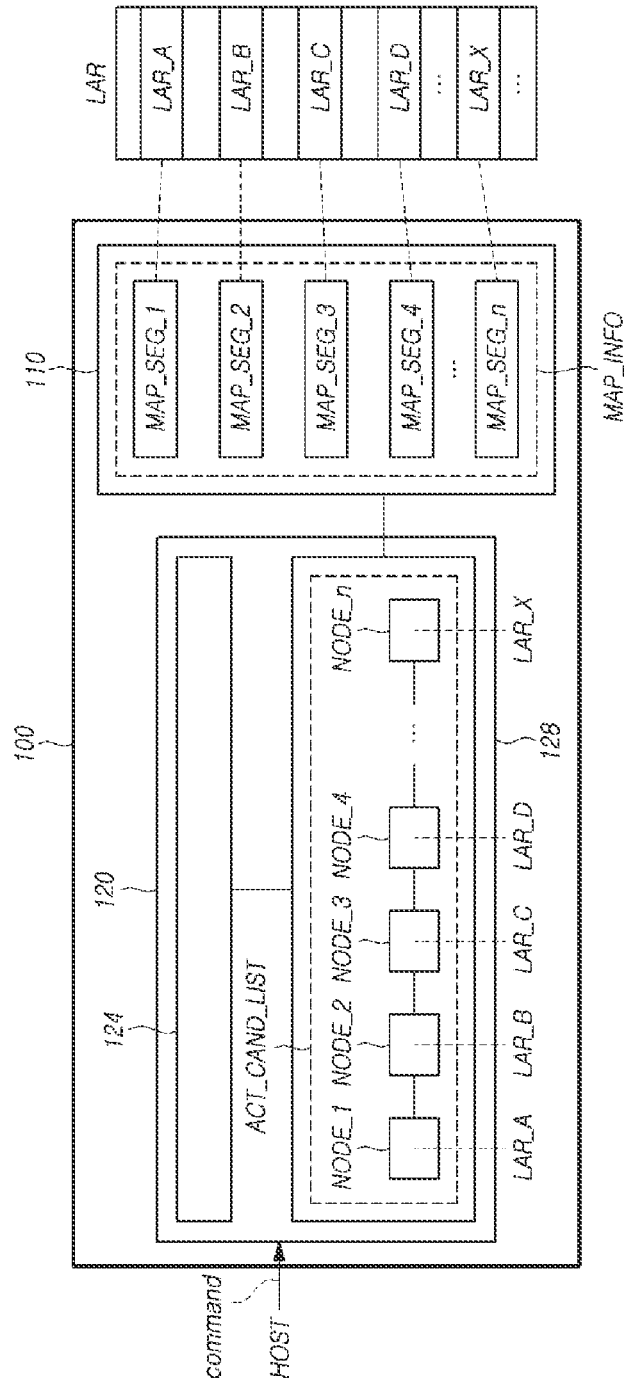
FIG. 3 illustrates an activation candidate list included in the memory controller according to embodiments of the present disclosure.

FIG. 3 illustrates an activation candidate list ACT_CAND_LIST included in the memory controller 120 according to embodiments of the present disclosure.

Referring to FIG. 3, the memory controller 120 may include a memory 128 configured to store an activate candidate list ACT_CAND_LIST including one or more nodes each indicating a logical address range that satisfies a preset activation candidate condition among a plurality of logical address ranges, which will be described later.

Furthermore, the memory 128 may be the aforementioned working memory 125.

The processor 124 of the memory controller 120 may process a command received from the host HOST. In this case, the command received from the host HOST may request an operation to access a specific logical address.

The host HOST may access the memory system 100 based on a logical address. In this case, the memory controller 120 may map a physical address to a specific logical address. The memory controller 120 may store mapping information between a logical address and a physical address in the memory device 110.

For example, mapping information MAP_INFO_1, MAP_INFO_2, MAP_INFO_3, MAP_INFO_4, . . . , MAP_INFO_n corresponding to a plurality of logical address ranges LAR_A, LAR_B, LAR_C, LAR_D, . . . , LAR_X may be stored in the memory device 110 described in FIG. 3. In this disclosure, each logical address range may include a plurality of logical addresses each corresponding to a memory region within the memory device 110 (see FIG. 4).

Moreover, the host HOST may determine in advance a physical address corresponding to a logical address to be accessed through a command, based on mapping information between a logical address and a physical address received from the memory controller 120. In this case, the host HOST may transmit a command including a physical address mapped to a specific logical address to the memory system 100. In addition, the memory controller 120 may directly access the physical address included in the command. In this case, the processor 124 may skip the operation of searching for a physical address mapped to a specific logical address.

To this end, for example, the host HOST may separately store mapping information between a logical address and a physical address received from the memory controller 120 in a host memory (not shown) included in the host HOST.

As described above, the memory controller 120 may receive a command including a physical address mapped to a specific logical address, and may access the physical address included in the command. Through this, the memory controller 120 may reduce the time required to search for mapping information between a logical address and a physical address. Accordingly, the memory controller 120 may process a command received from the host HOST faster than when directly searching for a physical address mapped to a logical address.

The memory controller 120 may include a processor 124 controlling the activation candidate list ACT_CAND_LIST including nodes NODE_1, NODE_2, NODE_3, NODE_4, . . . , NODE_n each indicating one of the plurality of logical address ranges LAR_A, LAR_B, LAR_C, LAR_D, . . . , LAR_X.

In the embodiments of the present disclosure, the node NODE_1 included in the activation candidate list ACT_CAND_LIST indicates the logical address range LAR_A, the node NODE_2 indicates the logical address range LAR_B, the node NODE_3 indicates the logical address range LAR_C, the node NODE_4 indicates the logical address range LAR_D, and the node NODE_n indicates the logical address range LAR_X.

The processor 124 may activate one or more logical address ranges from among the plurality of logical address ranges LAR_A, LAR_B, LAR_C, LAR_D, . . . , LAR_X indicated by the nodes NODE included in the activation candidate list ACT_CAND_LIST.

In addition, the processor 124 may transmit mapping information corresponding to an activated logical address range to the host HOST. As described above, the host HOST may store the mapping information received from the host HOST in the host memory, and directly refer to the mapping information between a logical address and a physical address from the mapping information MAP_INFO stored in the host memory.

The activation candidate list ACT_CAND_LIST may be implemented through various means, including an array, a linked list, a doubly linked list, a circular doubly linked list, etc. Furthermore, the means are not limited to the above-described examples.

A logical address range indicated by nodes included in the activation candidate list ACT_CAND_LIST may be a candidate for the above-described activation logical address range.

Figure 4:
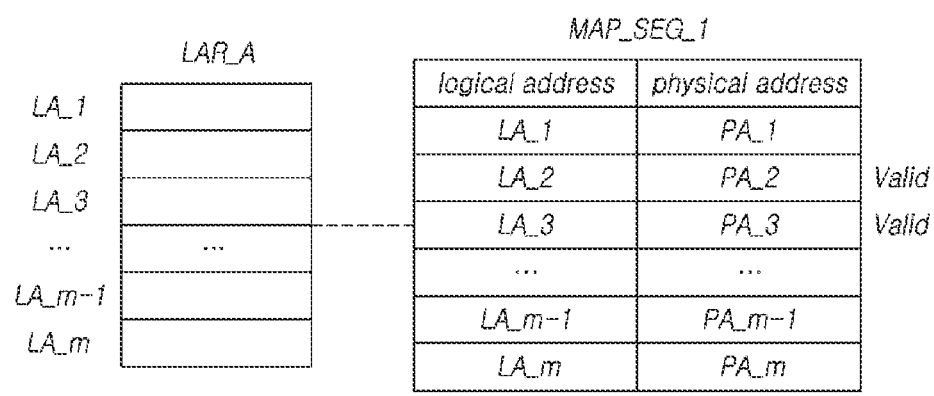
FIG. 4 illustrates an example of mapping information according to embodiments of the present disclosure.

FIG. 4 illustrates an example of mapping information according to embodiments of the present disclosure.

Referring to FIG. 4, among the mapping information MAP_INFO described with reference to FIG. 3, the mapping information MAP_INFO_1 may include mapping information between a logical address and a physical address included in a specific logical address range.

In this case, mapping information between a logical address and a physical address may be stored in a mapping table including a plurality of entries. In this case, each of the plurality of entries included in the mapping table may indicate mapping information between one logical address and one physical address.

Moreover, each of the plurality of entries included in the mapping table may further include information indicating whether data corresponding to logical address is valid.

When the data corresponding to logical address is changed by executing a write operation, an erase operation, or a background operation (e.g., garbage collection) on the data corresponding to the logical address, the memory controller 120 may update mapping information between the logical address and a physical address corresponding to the logical address.

In FIG. 4, the mapping information MAP_INFO_1 may correspond to the logical address range LAR_A. The logical address range LAR_A may include a logical address LA_1, a logical address LA_2, a logical address LA_3, a logical address LA_m-1, and a logical address LA_m. The logical address LA_1, the logical address LA_2, the logical address LA_3 to the logical address LA_m-1, and the logical address LA_m may be respectively mapped to a physical address PA_1, a physical address PA_2, a physical address PA_3 to a physical address PA_m-1 and a physical address PA_m included in the mapping information MAP_INFO_1.

Also, data corresponding to the logical address LA_2 and the logical address LA_3 of FIG. 4 may be valid.

When the logical address range LAR_A is activated, the memory controller 120 may transmit the mapping information MAP_INFO_1 corresponding to the logical address range LAR_A to the host HOST.

Thereafter, when accessing data corresponding to the logical address LA_2 included in the logical address range LAR_A, the host HOST may refer to the mapping information MAP_INFO_1 received from the memory controller 120. The host HOST may confirm that the physical address PA_2 is mapped to the logical address LA_2 by referring to the mapping information MAP_INFO_1 received from the memory controller 120. Accordingly, when the host HOST transmits a command corresponding to the logical address LA_2 to the memory controller 120, the host HOST may include the physical address PA_2 in the command.

Figure 5:
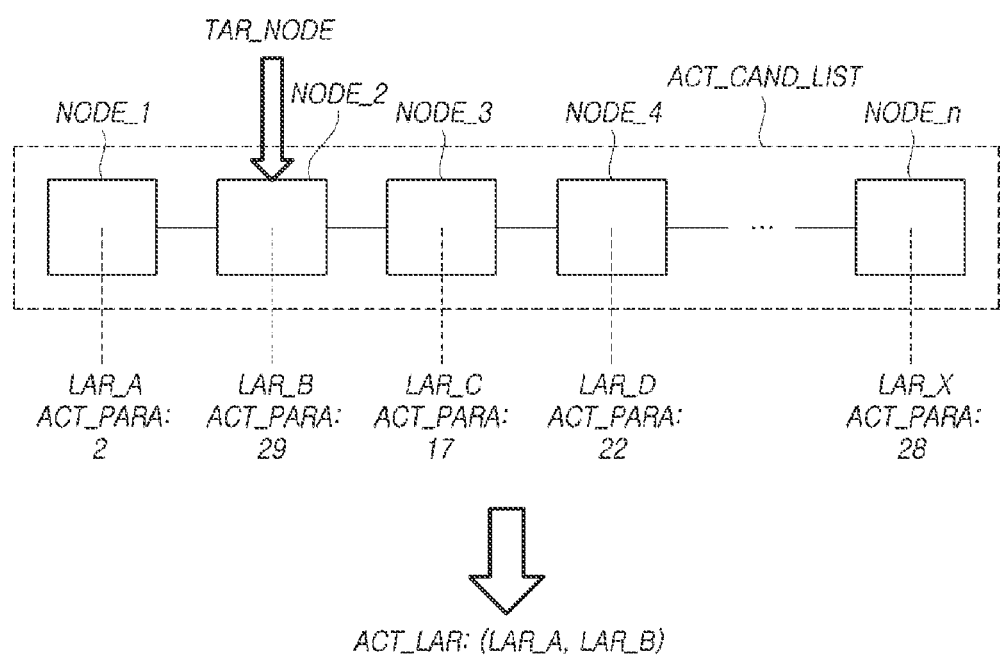
FIG. 5 illustrates an example of an operation for determining a target node and an activation logical address range according to embodiments of the present disclosure.

FIG. 5 illustrates an example of an operation for determining a target node TAR_NODE and an activation logical address range according to embodiments of the present disclosure.

Referring to FIG. 5, the processor 124 may determine the target node TAR_NODE based on activation parameter ACT_PARA of logical address ranges LAR_A, LAR_B, LAR_C, LAR_D, . . . , LAR_X corresponding to the nodes NODE_1, NODE_2, NODE_3, NODE_4, . . . , NODE_n included in the activation candidate list ACT_CAND_LIST respectively.

The processor 124 may determine one or more activation logical address ranges ACT_LAR from the activation candidate list ACT_CAND_LIST based on the target node TAR_NODE.

The activation parameter ACT_PARA is a parameter, among logical address ranges LAR_A, LAR_B, LAR_C, LAR_D, . . . , LAR_X corresponding to the nodes NODE_1, NODE_2, NODE_3, NODE_4, . . . , NODE_n included in the activation candidate list ACT_CAND_LIST respectively, used as a criterion for determining the target node TAR_NODE.

For example, the memory controller 120 may determine the target node TAR_NODE as a node indicating a logical address range having a maximum activation parameter ACT_PARA among logical address ranges LAR_A, LAR_B, LAR_C, LAR_D, . . . , LAR_X corresponding to the nodes NODE_1, NODE_2, NODE_3, NODE_4, . . . , NODE_n included in the activation candidate list ACT_CAND_LIST respectively.

In FIG. 5, the processor 124 may determine the node NODE_2 indicating the logical address range LAR_B with activation parameter of 29 as the target node TAR_NODE.

The processor 124 may determine one or more activation logical address ranges ACT_LAR based on determined target node TAR_NODE.

For example, the memory controller 120 may determine the logical address range indicated by the target node TAR_NODE and the logical address range indicated by the front node of the target node TAR_NODE as the active logical address range ACT_LAR.

The front node of the target node TAR_NODE is a node located immediately before the target node TAR_NODE among nodes included in the activation candidate list ACT_CAND_LIST. The front node of the target node TAR_NODE may include pointer information indicating that its next node is the target node TAR_NODE.

In FIG. 5, the processor 124 may determine the logical address range LAR_B indicated by the node NODE_2 that is the target node TAR_NODE and the logical address range LAR_A indicated by the node NODE_1 that is the front node of the target node TAR_NODE as an activation logical address range ACT_LAR.

In addition, the processor 124 may transmit, among the mapping information MAP_INFO described in FIG. 3, information indicating the logical address range LAR_A and the logical address range LAR_B, which are activation logical address ranges, to the host HOST.

Moreover, the activation logical address range ACT_LAR determined based on the target node TAR_NODE may be already activated. In this case, the host HOST has already stored mapping information corresponding to the activation logical address range ACT_LAR in the host memory. Accordingly, the processor 124 may skip transmitting information indicating the activation logical address range ACT_LAR to the host HOST.

Figure 6:
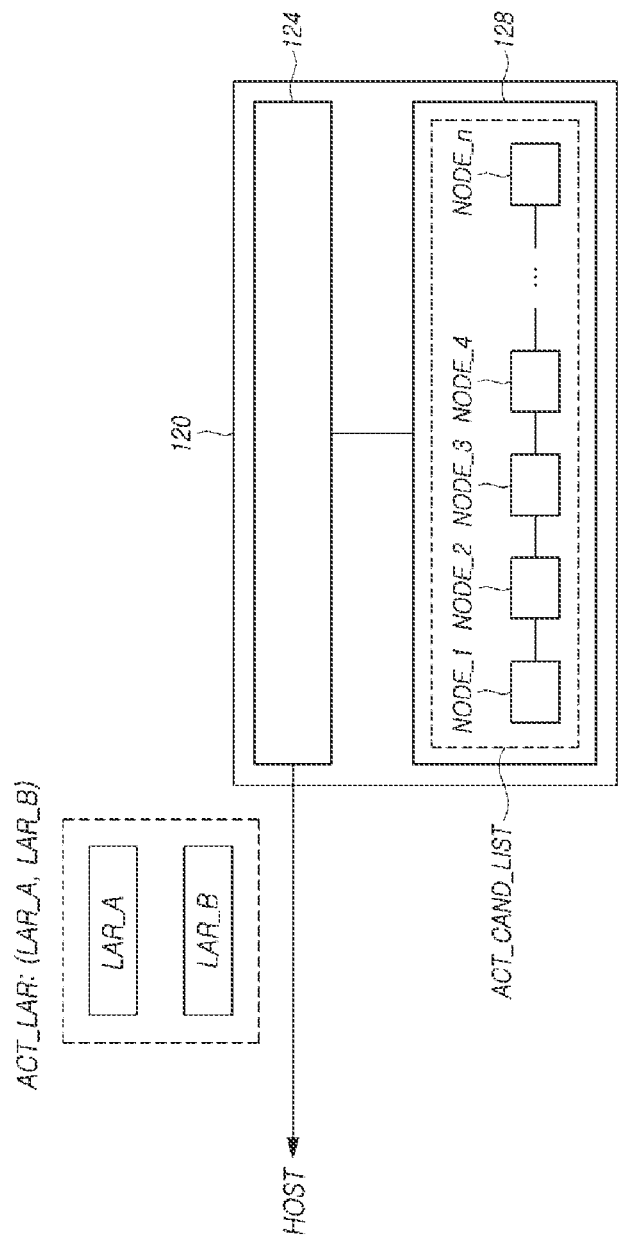
FIG. 6 illustrates an example of an operation in which the memory controller transmits information indicating the activation logical address range to the host according to embodiments of the present disclosure.

FIG. 6 illustrates an example of an operation in which the memory controller 120 transmits information indicating the activation logical address range to the host according to embodiments of the present disclosure.

Referring to FIG. 6, the memory controller 120 may transmit information indicating the activation logical address range ACT_LAR to the host HOST. The activation logical address range ACT_LAR is determined as the logical address range LAR_A and the logical address range LAR_B in FIG. 5. Therefore, the memory controller 120 may transmit information that the activation logical address range ACT_LAR is the logical address range LAR_A and the logical address range LAR_B.

Thereafter, the host HOST may request the memory system 100 for mapping information corresponding to the activation logical address range ACT_LAR.

For example, when the host HOST requests the memory controller 120 for mapping information corresponding to the activation logical address range ACT_LAR, the memory controller 120 may transmit mapping information corresponding to the activation logical address range ACT_LAR to the host HOST.

For another example, the memory controller 120 may load mapping information corresponding to the activation logical address range ACT_LAR into a specific memory area (not shown) accessible to the host HOST, and the host HOST may access the memory area and load mapping information corresponding to the activation logical address range ACT_LAR.

In FIG. 6, the activation logical address range ACT_LAR is the logical address range LAR_A and the logical address range LAR_B.

The processor 124 may read the mapping information MAP_INFO_1 and the mapping information MAP_INFO_2 corresponding to the logical address range LAR_A and the logical address range LAR_B respectively from the memory device 110. However, if the mapping information MAP_INFO_1 or the mapping information MAP_INFO_2 is already cached in the working memory 125, the processor 124 may skip the operation of reading mapping information from the memory device 110.

Thereafter, the memory controller 120 may transmit the mapping information MAP_INFO_1 and the mapping information MAP_INFO_2 corresponding to the activation logical address range ACT_LAR to the host HOST. In this case, if the logical address range LAR_A or the logical address range LAR_B is already activated, the processor 124 may skip transmitting the mapping information MAP_INFO_1 and the mapping information MAP_INFO_2.

Figure 7:
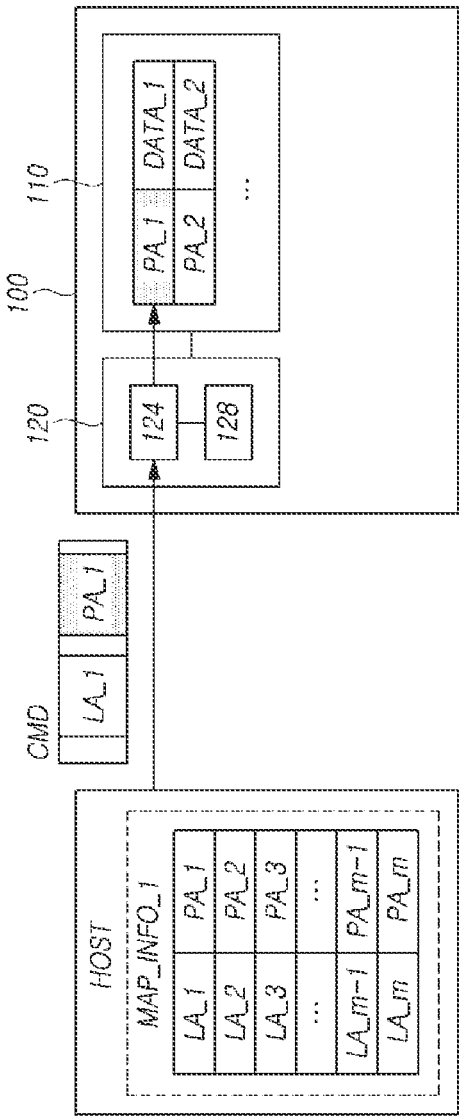
FIG. 7 illustrates an example of an operation in which the memory controller accesses using the physical address included in the mapping information according to embodiments of the present disclosure.

FIG. 7 illustrates an example of an operation in which the memory controller 120 accesses using the physical address included in the mapping information according to embodiments of the present disclosure.

Referring to FIG. 7, the memory controller 120 may receive a command CMD including a physical address PA_1 mapped to a logical address LA_1 from the host HOST.

In this case, the processor 124 may access a location indicated by the physical address PA_1 to execute a request indicated by the command CMD.

In order to access data stored in the memory device 110, the host HOST may add the logical address LA_1 to the command CMD and transmit the command CMD to the memory controller 120. In this case, the processor 124 may search for the physical address PA_1 mapped to the logical address LA_1 included in the command CMD, and access a location indicated by the physical address PA_1.

When the host HOST transmits the command CMD including the physical address PA_1 corresponding to the logical address LA_1 to the memory controller 120 based on mapping information stored in the host memory, the processor 124 may skip searching for the physical address PA_1 corresponding to the logical address LA_1.

In FIG. 7, when the host HOST accesses data corresponding to the logical address LA_1, the host HOST may determine the physical address PA_1 mapped to the logical address LA_1 by referring to the mapping information MAP_INFO_1 stored in the host memory (not shown) in the host HOST.

The host HOST may transmit the command CMD including the physical address PA_1 mapped to the logical address LA_1 to the memory controller 120.

In this case, the processor 124 may skip searching for the physical address PA_1 mapped to the logical address LA_1, and directly access a location indicated by the physical address PA_1 included in the command CMD in the memory device 110.

The processor 124 may access data DATA_1 stored in the physical address PA_1 included in the command CMD.

The memory controller 120 may shorten the time required to search for mapping information between the logical address LA_1 and the physical address PA_1 by directly accessing the location indicated by the physical address PA_1.

Figure 8:
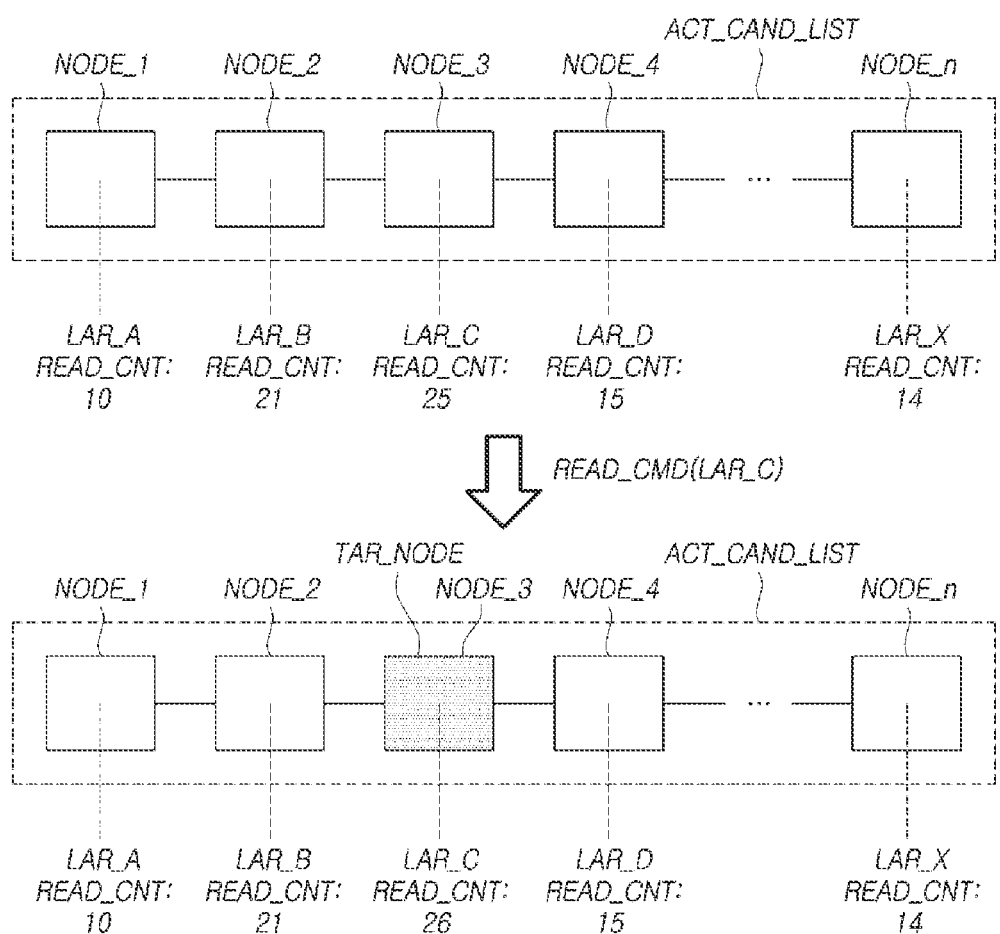
FIG. 8 illustrates an example of an operation in which the memory controller determines the target node based on read count according to embodiments of the present disclosure.

FIG. 8 illustrates an example of an operation in which the memory controller 120 determines the target node TAR_NODE based on read count READ_CNT according to embodiments of the present disclosure.

Referring to FIG. 8, the activation parameter ACT_PARA described above in FIG. 6 may be a read count READ_CNT for memory regions indicated by each of the logical address ranges LAR_A, LAR_B, LAR_C, LAR_D, . . . , LAR_X corresponding to the nodes NODE_1, NODE_2, NODE_3, NODE_4, . . . , NODE_N in the activation candidate list ACT_CAND_LIST respectively.

When the processor 124 receives a read command READ_CMD from the host HOST, the processor 124 may increase a read count of a logical address range, among the plurality of logical address ranges LAR_A, LAR_B, LAR_C, LAR_D, . . . , LAR_X within the activation candidate list ACT_CAND_LIST, corresponding to the read command READ_CMD.

In this case, the processor 124 may determine, among the nodes included in the activation candidate list ACT_CAND_LIST, a node indicating a logical address range in which read count READ_CNT is greater than or equal to a set threshold count READ_CNT_THR as the target node TAR_NODE.

The processor 124 may determine a logical address range having a large read count READ_CNT as a logical address range having a high frequency of access by the host HOST.

In FIG. 8, the read counts READ_CNT of the logical address range LAR_A, the logical address range LAR_B, the logical address range LAR_C, the logical address range LAR_D and the logical address range LAR_X are 10, 21, 15, 15, 14 respectively, and the threshold count READ_CNT_THR is 26.

When the processor 124 receives the read command READ_CMD requesting to read data corresponding to the logical address range LAR_C, the processor 124 may increase the read count READ_CNT of the logical address range LAR_C by 1. In this case, the read count READ_CNT of the logical address range LAR_C is 25+1=26.

Since the read count READ_CNT of the logical address range LAR_C becomes greater than or equal to 26, which is the threshold count READ_CNT_THR, the processor 124 may determine the node NODE_3 indicating the logical address range LAR_C as the target node TAR_NODE.

Furthermore, when the number of logical address ranges having a read count equal to or greater than the threshold count READ_CNT_THR is plural, the processor 124 may determine one of the nodes NODE indicating the plurality of logical address ranges as the target node TAR_NODE.

The processor 124 may transmit mapping information corresponding to a logical address range frequently accessed by the host HOST by determining the target node TAR_NODE to determine the activation logical address range based on the read count READ_CNT. In addition, the host HOST may directly determine a physical address mapped to a logical address included in the logical address range by referring to mapping information received from the memory controller 120, and the host HOST may transmit the command CMD including the physical address to the memory controller 120.

Figure 9:
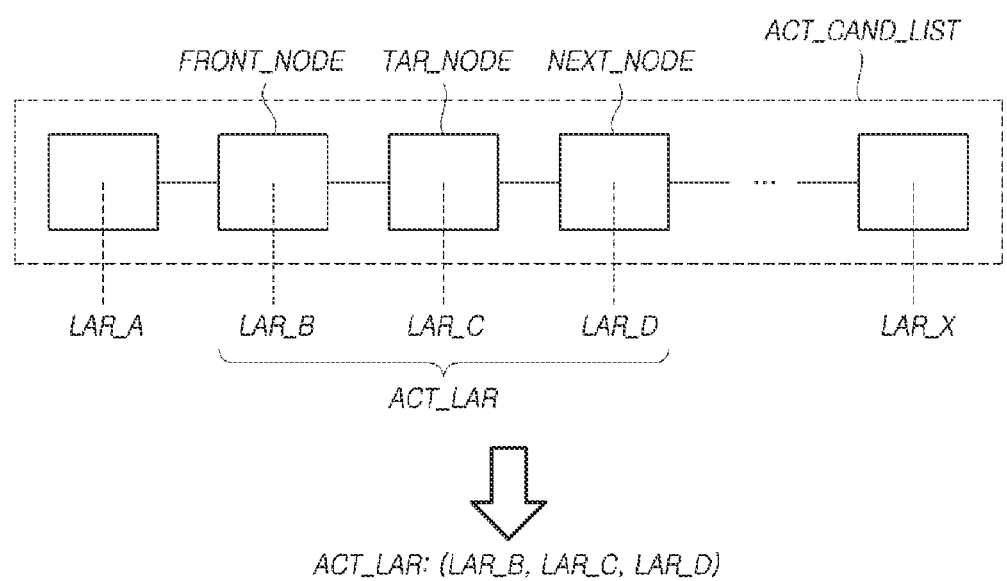
FIG. 9 illustrates an example of the activation logical address range according to embodiments of the present disclosure.

FIG. 9 illustrates an example of the activation logical address range ACT_LAR according to embodiments of the present disclosure.

Referring to FIG. 9, the processor 124 may determine a logical address range indicated by the target node TAR_NODE, a logical address range indicated by the front node of the target node TAR_NODE and a logical address range indicated by the next node of the target node TAR_NODE as the activation logical address range ACT_LAR.

By analyzing the workload of the host HOST, it can be seen that other logical address ranges related to the logical address range requested by the host HOST through a command are frequently requested from the host HOST later.

Based on this, a map segment corresponding to the logical address range may be provided to the host HOST by predicting a logical address range that is likely to be requested from the host HOST in the future and activating it in advance.

As described above, the order of nodes included in the activation candidate list ACT_CAND_LIST may be determined according to the connection state of the nodes.

In this case, a node located in an order preceding a specific node may be defined as a front node FRONT_NODE, and a node located in a following order may be defined as a next node NEXT_NODE.

In this case, the front node FRONT_NODE of the node may include a pointer indicating that its next node is the node. And the node may include a pointer indicating its next node NEXT_NODE.

When the activation candidate list ACT_CAND_LIST is a doubly linked list, the next node NEXT_NODE of the node may include a pointer indicating that its front node is the node, and the node may include a pointer indicating its front node FRONT_NODE.

The processor 124 may determine the logical address range indicated by the target node TAR_NODE, the logical address range indicated by the front node FRONT_NODE, and the logical address range indicated by the next node NEXT_NODE as the activation logical address range ACT_LAR.

In FIG. 9, the target node TAR_NODE indicates the logical address range LAR_C, and the front node FRONT_NODE of the target node TAR_NODE indicates the logical address range LAR_B, and the next node NEXT_NODE of the target node TAR_NODE indicates the logical address range LAR_D.

The processor 124 may determine the logical address range LAR_C, the logical address range LAR_B and the logical address range LAR_D as the activation logical address range ACT_LAR.

Through this, the processor 124 may activate in advance not only the logical address range LAR_C indicated by the target node TAR_NODE, but also the logical address range LAR_B and the logical address range LAR_D related thereto.

The memory controller 120 may transmit mapping information corresponding to the logical address ranges determined as the activation logical address range ACT_LAR to the host HOST. In addition, the host HOST may store the mapping information received from the memory controller 120 in the host memory (not shown).

Later, when the host HOST accesses data corresponding to the logical address range LAR_B or the logical address range LAR_D, the host HOST may transmit a command including a physical address mapped to a logical address to be accessed to the memory system 100 based on mapping information corresponding to the logical address range LAR_B or the logical address range LAR_D.

Figure 10:
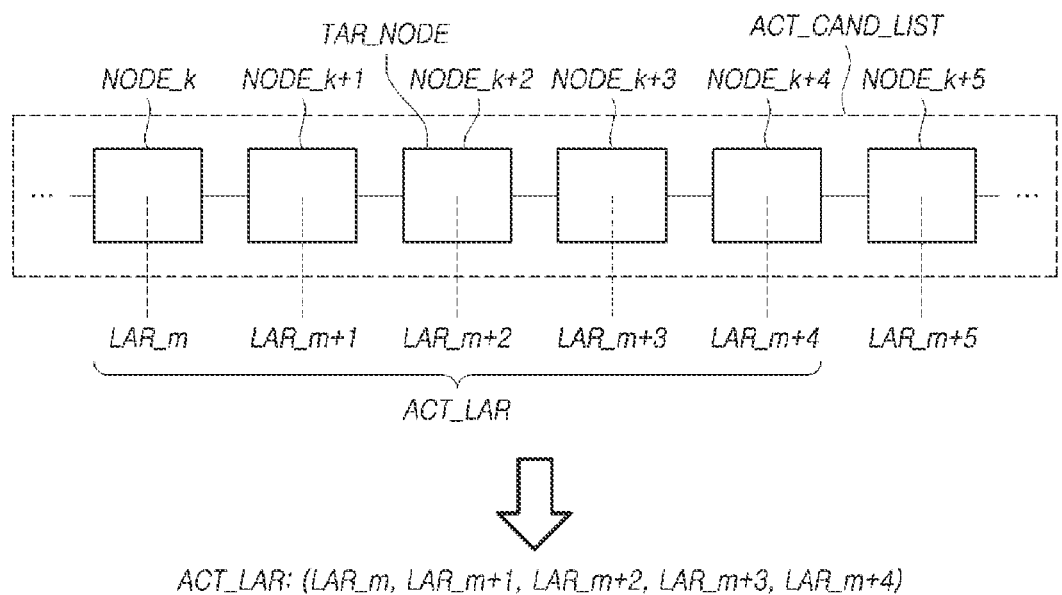
FIG. 10 illustrates another example of the activation logical address range according to embodiments of the present disclosure.

FIG. 10 illustrates another example of the activation logical address range ACT_LAR according to embodiments of the present disclosure.

Referring to FIG. 10, the processor 124 may determine, among nodes included in the activation candidate list ACT_CAND_LIST, logical address ranges indicated by set logical address range count NUMBER_OF_LARs nodes as the activation logical address range ACT_LAR.

In this case, the logical address range count NUMBER_OF_LARs nodes are consecutive with each other. That is, each of the logical address range count NUMBER_OF_LARs nodes is connected through a pointer indicating its next node.

Further, the target node TAR_NODE is included in the logical address range count NUMBER_OF_LARs nodes.

As described above, there may be a high possibility that other logical address ranges related to the logical address range requested by the host HOST through a command are to be requested from the host HOST later.

At this time, as the host HOST acquires more mapping information, the probability that a physical address mapped to a logical address to be accessed by the host HOST can be directly searched from the mapping information stored in the host HOST increases.

The processor 124 may increase the probability of directly referencing a physical address mapped to a logical address to be accessed by the host HOST from the host memory by determining the set logical address range count NUMBER_OF_LARs consecutive logical address ranges as the activation logical address range ACT_LAR.

The logical address range count NUMBER_OF_LARs set in FIG. 10 is 5.

In FIG. 10, the processor 124 may determine, among the nodes included in the activation candidate list ACT_CAND_LIST, logical address ranges LAR_m, LAR_m+1, LAR_m+2, LAR_m+3, LAR_m+4 indicated by the consecutive nodes NODE_k, NODE_k+1, NODE_k+2, NODE_k+3, NODE_k+4 of the logical address range count NUMBER_OF_LARs, in which the target node TAR_NODE is included, as the activation logical address range ACT_LAR.

The processor 124 may transmit mapping information corresponding to the logical address range count NUMBER_OF_LARs logical address ranges LAR_m, LAR_m+1, LAR_m+2, LAR_m+3, LAR_m+4 to the host HOST.

Moreover, unlike that described with reference to FIG. 10, the processor 124 determines the logical address ranges LAR_m+1, LAR_m+2, LAR_m+3, LAR_m+4, LAR_m+5, instead of the logical address ranges LAR_m, LAR_m+1, LAR_m+2, LAR_m+3, LAR_m+4, as the activation logical address range ACT_LAR. In addition, the memory controller 120 may determine the activation logical address range ACT_LAR based on the target node TART_NODE in various ways.

Moreover, the host HOST or the memory controller 120 may increase or decrease the logical address range count NUMBER_OF_LARs as needed.

In order to increase the probability that the host HOST directly refers to a physical address mapped to a logical address to be accessed, the host HOST or the memory system 100 may increase the logical address range count NUMBER_OF_LARs.

On the other hand, when a space for storing mapping information is insufficient in the host memory in the host HOST, the host HOST or the memory controller 120 may decrease the logical address range count NUMBER_OF_LARs.

Figure 11:
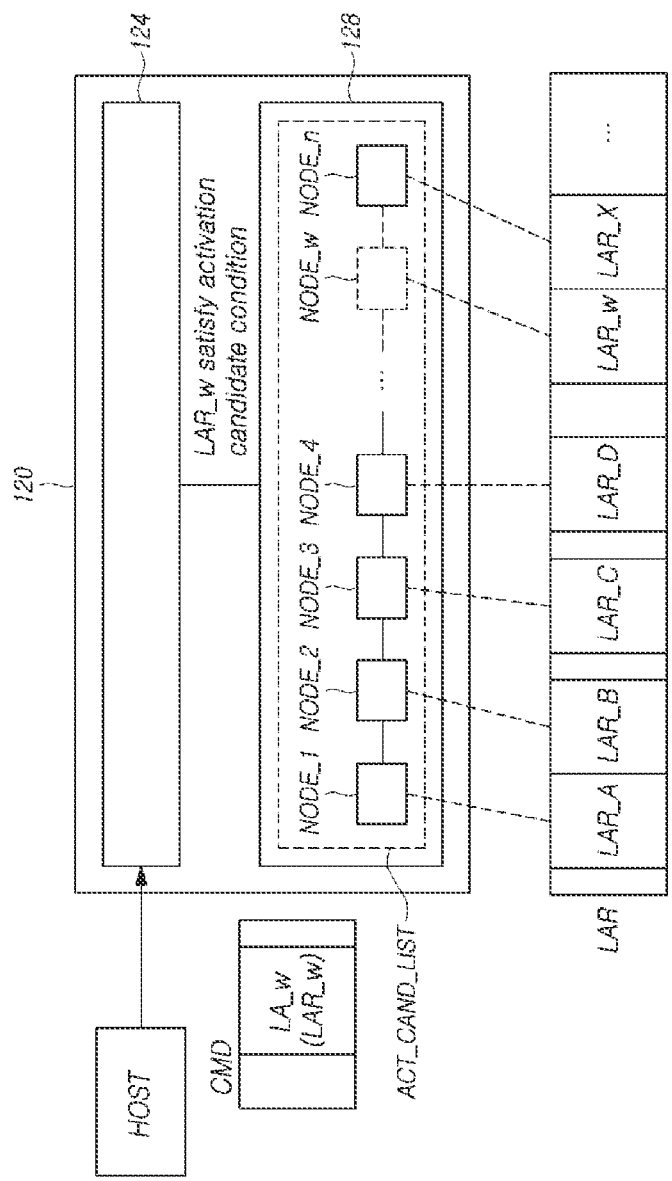
FIG. 11 illustrates an example of an operation in which the memory controller inserts a node into the activation candidate list according to embodiments of the present disclosure.

FIG. 11 illustrates an example of operation in which the memory controller 120 inserts a node into the activation candidate list ACT_CAND_LIST according to embodiments of the present disclosure.

Referring to FIG. 11, when the logical address range corresponding to the command CMD received from the host HOST satisfies an activation candidate condition, the processor 124 may insert the node NODE_w indicating logical address range corresponding to the command CMD received from the HOST into the activation candidate list ACT_CAND_LIST.

The activation candidate list ACT_CAND_LIST of FIG. 11 includes nodes NODE_1, NODE_2, NODE_3, NODE_4, . . . , NODE_n. At this time, the logical address ranges LAR_A, LAR_B, LAR_C, LAR_D, . . . , LAR_X indicated by the nodes NODE_1, NODE_2, NODE_3, NODE_4, . . . , NODE_n may be the logical address ranges that already satisfy the activation candidate condition.

When the logical address range LAR_w, among the logical address ranges LAR_A, LAR_B, LAR_C, LAR_D, . . . , LAR_X. satisfies the activation candidate condition, the processor 124 may insert the node NODE_w into the activation candidate list ACT_CAND_LIST.

In this case, if necessary, the processor 124 may delete one or more of the nodes included in the activation candidate list ACT_CAND_LIST from the activation candidate list ACT_CAND_LIST.

When a logical address range that satisfies the activation candidate condition exists among other logical address ranges not corresponding to the nodes included in the activation candidate list ACT_CAND_LIST, the processor 124 may generate a node indicating the corresponding logical address range and then additionally insert it into the activation candidate list ACT_CAND_LIST.

Figure 12:
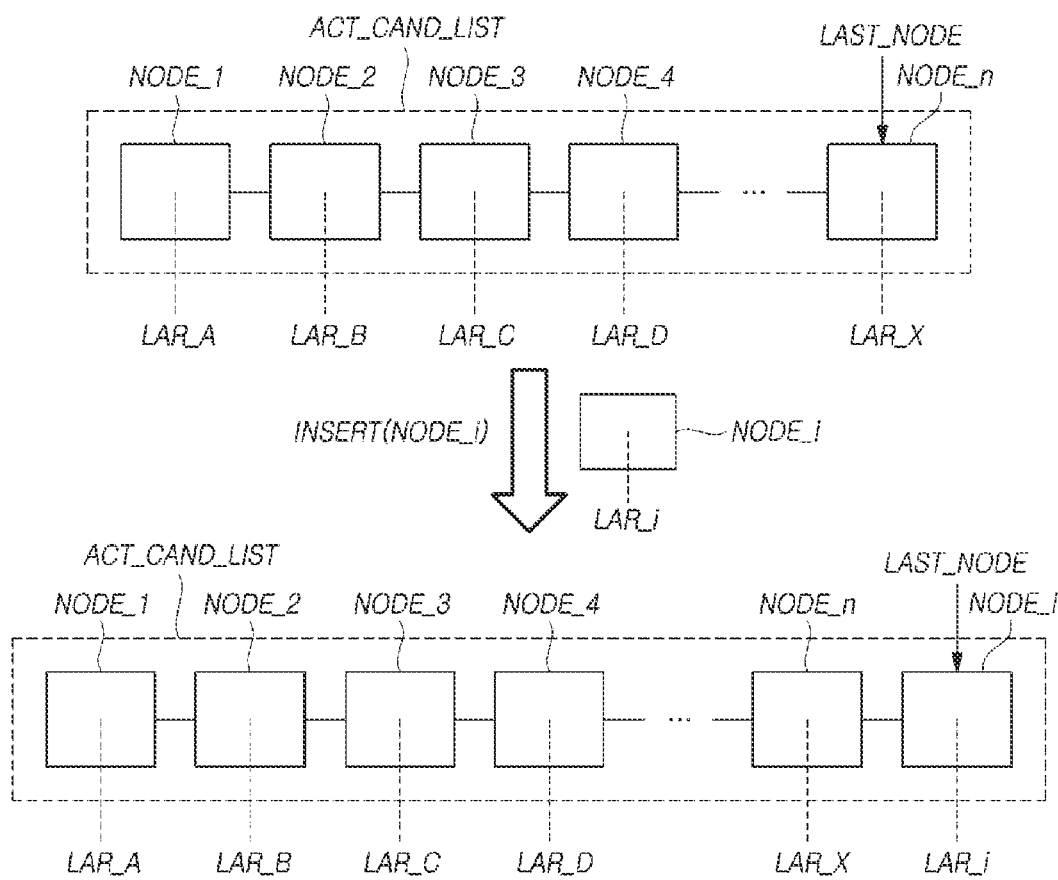
FIG. 12 illustrates an example of an operation in which the memory controller inserts a node into the activation candidate list at the end of the activation candidate list according to embodiments of the present disclosure.

FIG. 12 illustrates an example of an operation in which the memory controller 120 inserts a node into the activation candidate list ACT_CAND_LIST at the end of the activation candidate list according to embodiments of the present disclosure.

Referring to FIG. 12, when the processor 124 inserts the node indicating the candidate logical address range into the activation candidate list ACT_CAND_LIST, the processor 124 may insert the node indicating the candidate logical address range at the end of the activation candidate list ACT_CAND_LIST.

An order between nodes included in the activation candidate list ACT_CAND_LIST may be arranged based on a time point at which the nodes are inserted into the activation candidate list ACT_CAND_LIST. In this case, the last node LAST_NODE of the activation candidate list ACT_CAND_LIST indicates the last inserted node among the nodes included in the activation candidate list ACT_CAND_LIST.

When the processor 124 inserts the node indicating the candidate logical address range into the activation candidate list ACT_CAND_LIST, the processor 124 may insert the node indicating the candidate logical address range at the end of the activation candidate list ACT_CAND_LIST. Through this, the memory controller 120 may manage the activation candidate list ACT_CAND_LIST so that nodes included in the activation candidate list ACT_CAND_LIST are arranged according to a time sequence in which logical address ranges corresponding to the nodes satisfy the activation candidate condition.

In FIG. 12, the processor 124 may insert a node NODE_i indicating a logical address range LAR_i into the activation candidate list ACT_CAND_LIST.

The last node LAST_NODE of the activation candidate list ACT_CAND_LIST at the time before the insertion of the node NODE_i is the node NODE_n indicating the logical address range LAR_X.

The processor 124 may insert the node NODE_i at the end of the activation candidate list ACT_CAND_LIST. After the node NODE_i is inserted into the activation candidate list ACT_CAND_LIST, the node NODE_i becomes the last node LAST_NODE of the activation candidate list ACT_CAND_LIST.

Figure 13:
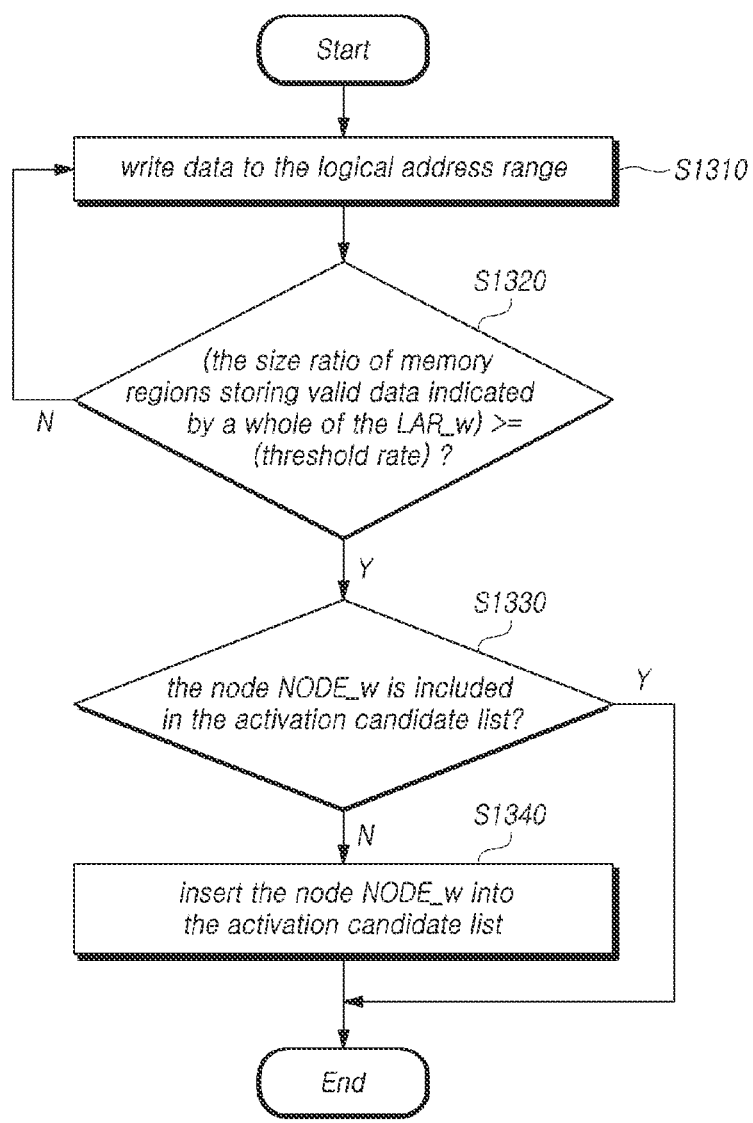
FIG. 13 illustrates a flow chart illustrating an example in which the memory controller manages the activation candidate list according to embodiments of the present disclosure.

FIG. 13 illustrates a flow chart illustrating an example in which the memory controller 120 manages the activation candidate list ACT_CAND_LIST according to embodiments of the present disclosure.

Referring to FIG. 13, the activation candidate condition of the memory controller 120 may be satisfied when a size ratio of memory regions storing valid data among memory regions indicated by a whole of the logical address range corresponding to the command CMD received from the host HOST is greater than or equal to a set threshold rate, and a node indicating a logical address range corresponding to the command CMD received from the host HOST is not included in the activation candidate list ACT_CAND_LIST.

For example, the memory controller 120 may receive a command requesting writing data to a logical address range LAR_w from the host HOST.

The memory controller 120 may write data to the logical address range LAR_w in response to the request from the host HOST (S1310).

The processor 124 may determine whether the size ratio of memory regions storing valid data among memory regions indicated by a whole of the logical address range LAR_w is greater than or equal to the threshold rate RATE_THRESHOLD (S1320). As the threshold rate RATE_THRESHOLD is higher, the number of logical address ranges indicated by the nodes included in the activation candidate list ACT_CAND_LIST may decrease, but the size of memory regions storing valid data among memory regions indicated by a whole of the logical address range may be relatively large.

On the other hand, as the threshold rate RATE_THRESHOLD is lower, the number of logical address ranges indicated by the nodes included in the activation candidate list ACT_CAND_LIST may increase, but the size of memory regions storing valid data among memory regions indicated by a whole of the logical address range may be relatively small.

When the size ratio of memory regions storing valid data among memory regions indicated by a whole of the logical address range LAR_w is less than the threshold rate RATE_THRESHOLD (S1320—N), the processor 124 does not insert the node NODE_w into the activation candidate list ACT_CAND_LIST, but writes additional data to the logical address range LAR_w (S1310).

When the size ratio of memory regions storing valid data among memory regions indicated by a whole of the logical address range LAR_w is greater than or equal to the threshold rate RATE_THRESHOLD (S1320—Y), the processor 124 may determine whether the node NODE_w indicating the logical address range LAR_w is included in the activation candidate list ACT_CAND_LIST (S1330).

When the node NODE_w indicating the logical address range LAR_w is already included in the activation candidate list ACT_CAND_LIST (S1330—Y), the processor 124 may terminate the process without inserting the node NODE_w back into the activation candidate list ACT_CAND_LIST.

When the node NODE_w indicating the logical address range LAR_w is not included in the activation candidate list ACT_CAND_LIST (S1330—N), the processor 124 may insert the node NODE_w into the activation candidate list ACT_CAND_LIST (S1340).

Figure 14:
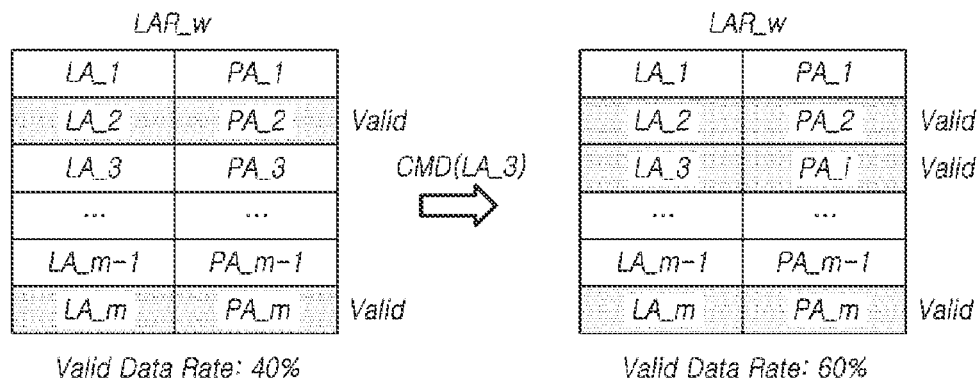
FIG. 14 illustrates an example of an operation in which the memory controller adds a node into the activation candidate list based on the size ratio of memory regions storing valid data among memory regions indicated by a whole of the logical address range according to embodiments of the present disclosure.
Figure 14:
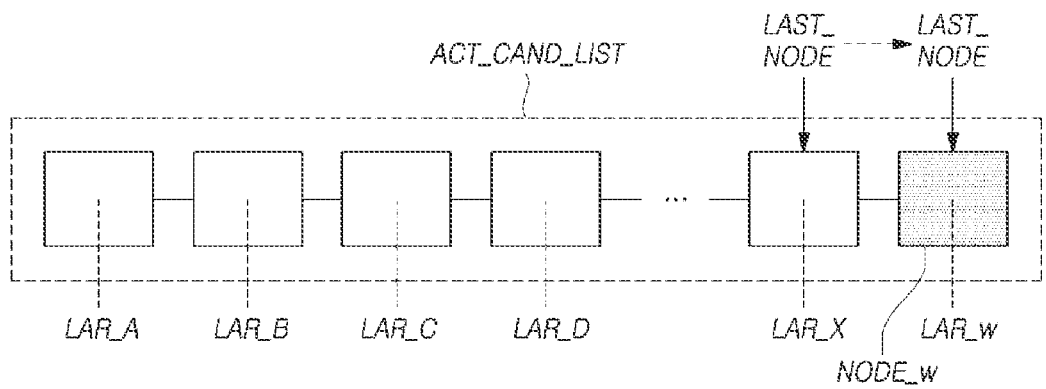

FIG. 14 illustrates an example of operation in which the memory controller 120 adds a node into the activation candidate list ACT_CAND_LIST based on the size ratio of memory regions storing valid data among memory regions indicated by a whole of the logical address range according to embodiments of the present disclosure.

In FIG. 14, the threshold rate RATE_THRESHOLD of the activation candidate condition is set to 50%.

In this case, the size ratio of memory regions storing valid data among memory regions indicated by a whole of the logical address range LAR_w is 40% and the node NODE_w indicating the logical address range LAR_w is not yet included in the activation candidate list ACT_CAND_LIST.

In FIG. 14, the memory controller 120 receives a command (CMD(LA_3)) requesting an operation to write data corresponding to a logical address LA_3 from the host HOST.

The processor 124 may write data to a memory region of a new physical address PA_i to process the command (CMD(LA_3)) received from the host HOST, and maps the new physical address PA_i to the logical address LAR_3. In this case, data stored in the memory region of the new physical address PA_i is valid data.

Therefore, the size ratio of memory regions storing valid data among memory regions indicated by a whole of the logical address range LAR_w is increased to 60%, which is greater than the threshold rate RATE_THRESHOLD.

Since the logical address range LAR_w satisfies the activation candidate condition, the memory controller 120 may insert the node NODE_w indicating the logical address range LAR_w into the activation candidate list ACT_CAND_LIST. At this time, the last node LAST_NODE of the activation candidate list ACT_CAND_LIST is a node NODE_w.

Figure 15:
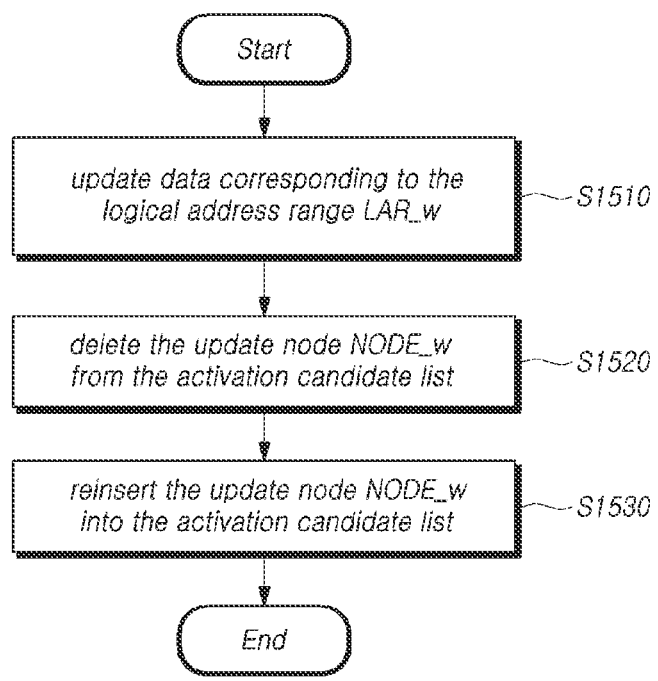
FIG. 15 illustrates a flow chart illustrating another example in which the memory controller manages the activation candidate list according to embodiments of the present disclosure.

FIG. 15 illustrates a flow chart illustrating another example in which the memory controller 120 manages the activation candidate list ACT_CAND_LIST according to embodiments of the present disclosure.

Referring to FIG. 15, the processor 124 may delete, when data is updated in one or more memory regions indicated by the logical address range indicated by an update node which is one of the nodes included in the activation candidate list ACT_CAND_LIST, the update node from the activation candidate list ACT_CAND_LIST.

In this case, the processor 124 may determine whether the logical address range indicated by the update node satisfies the activation candidate condition.

The processor 124 may re-insert the update node into the activation candidate list ACT_CAND_LIST according to the result of the determination.

The memory controller 120 may receive a command requesting update of data corresponding to the logical address range LAR_w from the host HOST.

The processor 124 may update data corresponding to the logical address range LAR_w in response to the command received from the host HOST. In this case, if the update node indicating the logical address range LAR_w is included in the activation candidate list ACT_CAND_LIST, the processor 124 may update the activation candidate list ACT_CAND_LIST.

In FIG. 15, the processor 124 may update data corresponding to the logical address range LAR_w in response to the command received from the host HOST (S1510).

After data is updated in the logical address range LAR_w indicated by the update node NODE_w included in the activation candidate list ACT_CAND_LIST, the processor 124 may delete the update node NODE_w from the activation candidate list ACT_CAND_LIST (S1520).

The processor 124 may reinsert the update node NODE_w, which was deleted in operation S1520 (S1530). In a process in which the update node NODE_w is deleted from and reinserted into the activation candidate list ACT_CAND_LIST, the position of the update node NODE_w on the activation candidate list ACT_CAND_LIST may be changed.

Through this, the memory controller 120 may manage the activation candidate list ACT_CAND_LIST in response to data corresponding to the logical address range LAR_w being updated.

Figure 16:
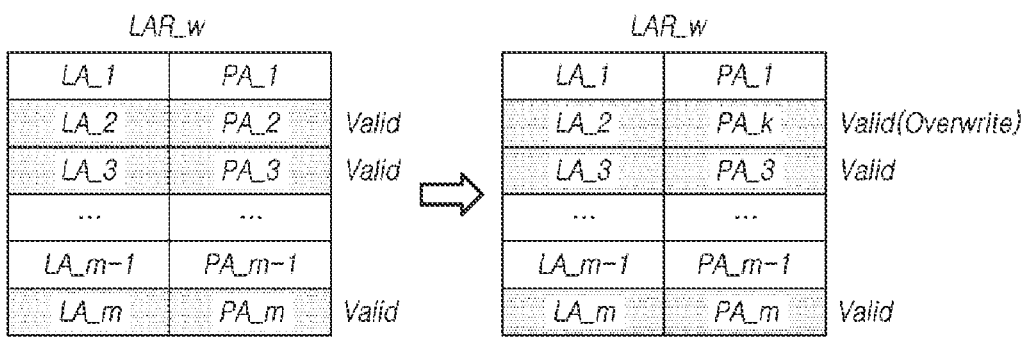
FIG. 16 illustrates mapping information when data corresponding to logical address range is updated according to embodiments of the present disclosure.
Figure 16:
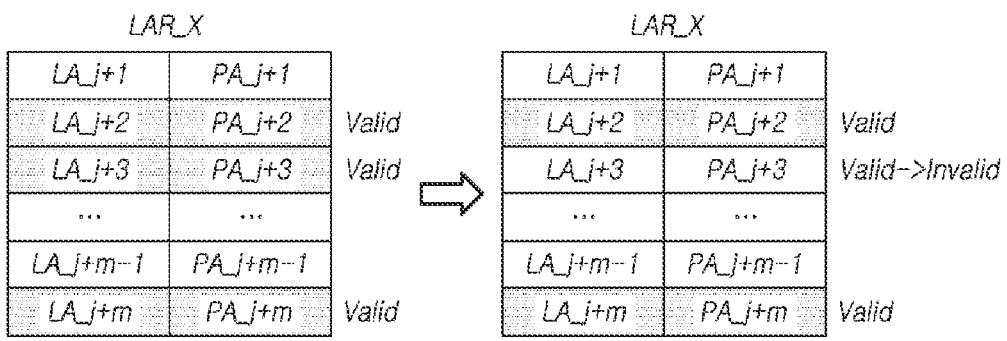

FIG. 16 illustrates mapping information when data corresponding to logical address range is updated according to embodiments of the present disclosure.

FIG. 16 shows a change in mapping information between a logical address and a physical address when data corresponding to the logical address range LAR_w is overwritten and when data corresponding to the logical address range LAR_w is deleted.

For example, the processor 124 may overwrite data corresponding to a logical address LA_2, which is included in the logical address range LAR_w.

To this end, the processor 124 may write data to be overwritten to a new physical address PA_k, and map the new physical address PA_k to a logical address LA_3.

In this case, the rate of the total size of the logical address range LAR_w to the size of the logical address range to which valid data is written is same as before.

For another example, the processor 124 may delete data corresponding to a logical address LA_j+3, which is included in the logical address range LAR_X.

After the processor 124 deletes data corresponding to the logical address LA_j+3, the processor 124 may set information that data stored in a physical address PA_j+3 mapped to the logical address LA_j+3 is invalid.

In this case, the rate of the total size of the logical address range LAR_w to the size of the logical address range to which valid data is written is decreased.

After data corresponding to the logical address range LAR_w and the logical address range LAR_X is overwritten or deleted, the memory controller 120 may determine again whether the logical address range LAR_w and the logical address range LAR_X satisfy the activation candidate condition.

When the logical address range LAR_w and the logical address range LAR_X satisfy the activation candidate condition, the processor 124 may re-insert a node indicating the logical address range LAR_w and a node indicating the logical address range LAR_X into the activation candidate list ACT_CAND_LIST.

On the other hand, when the logical address range LAR_w and the logical address range LAR_X don't satisfy the activation candidate condition, the processor 124 may not insert a node indicating the logical address range LAR_w and a node indicating the logical address range LAR_X into the activation candidate list ACT_CAND_LIST.

Figure 17:
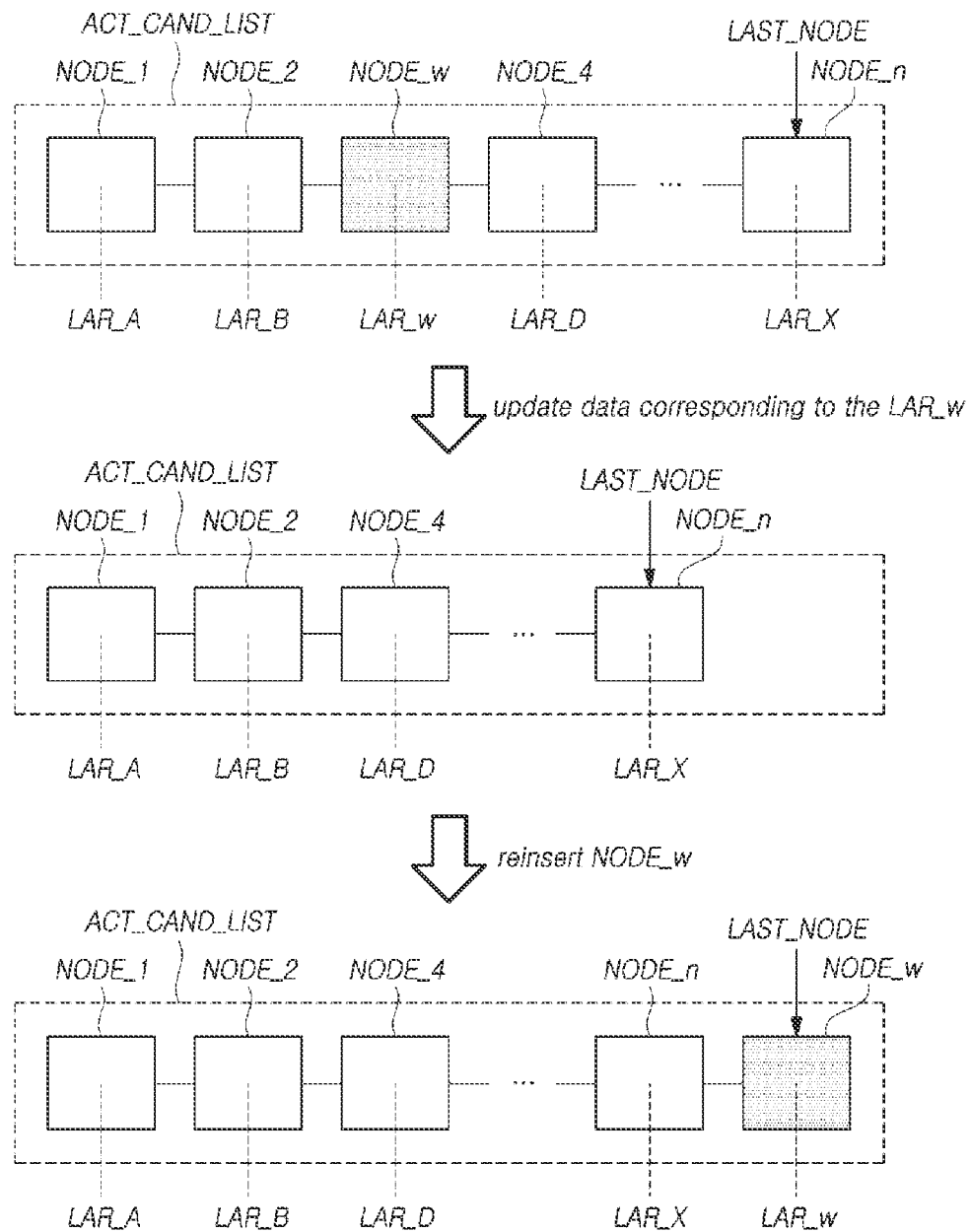
FIG. 17 illustrates an example in which the memory controller inserts a node indicating a specific logical address into the activation candidate list according to embodiments of the present disclosure.

FIG. 17 illustrates an example in which the memory controller 120 inserts a node indicating a specific logical address into the activation candidate list ACT_CAND_LIST according to embodiments of the present disclosure.

In FIG. 17, data corresponding to the logical address range LAR_w is updated. In this case, the processor 124 may delete the node NODE_w indicating the logical address range LAR_w from the activation candidate list ACT_CAND_LIST.

When the node NODE_w is deleted from the activation candidate list ACT_CAND_LIST, the next node of the node NODE_2 is changed to the node NODE_4, and the front node of the node NODE_4 is changed to the node NODE_2.

Thereafter, the memory controller 120 may reinsert the node NODE_w, which was deleted from the activation candidate list ACT_CAND_LIST, into the activation candidate list ACT_CAND_LIST. In a process in which the node NODE_w is deleted from the activation candidate list ACT_CAND_LIST and then reinserted, the position of the node NODE_w on the activation candidate list ACT_CAND_LIST may be changed.

In FIG. 17, the memory controller 120 may reinsert the node NODE_w into the activation candidate list ACT_CAND_LIST. In this case, the last node LAST_NODE of the activation candidate list ACT_CAND_LIST becomes the node NODE_w.

After the node NODE_w is reinserted into the activation candidate list ACT_CAND_LIST, the memory controller 120 may perform the above-described operation of determining the activation logical address range ACT_LAR.

Figure 18:
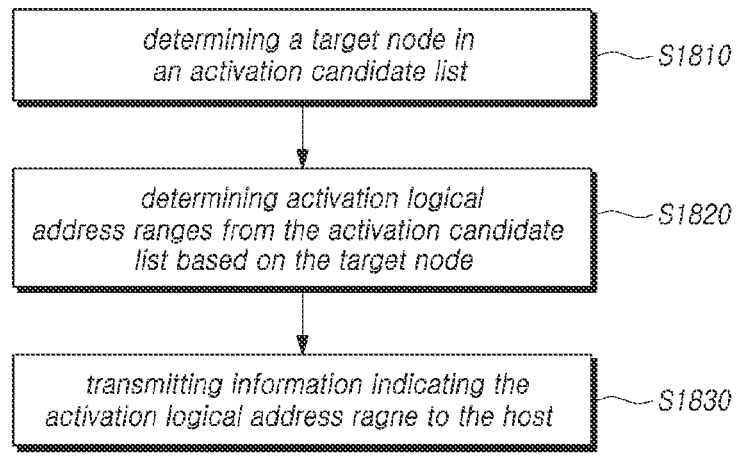
FIG. 18 illustrates an operating method of the memory controller according to embodiments of the present disclosure.

FIG. 18 illustrates an operating method of the memory controller 120 according to embodiments of the present disclosure.

Referring to FIG. 18, the operating method of the memory controller 120 may include determining a target node based on the activation parameters of logical address ranges corresponding to nodes included in an activation candidate list including one or more nodes each indicating a logical address range that satisfies a preset activation candidate condition among a plurality of logical address ranges (S1810).

In this case, the activation parameter may be a read count for each logical address range corresponding to the node included in the activation candidate list.

In this case, the operation S1810 may include receiving a read command from the host HOST.

The operation S1810 may include increasing read count of a logical address range corresponding to the read command.

The operation S1810 may include determining a node indicating a logical address range in which the read count is equal to or greater than a set threshold count among the nodes included in the activation candidate list as the target node.

The operating method of the memory controller 120 may include determining, as activation logical address ranges, one or more logical address ranges from the activation candidate list based on the target node (S1820).

In this case, a logical address range indicated by the target node, a logical address range indicated by the front node of the target node and a logical address range indicated by the next node of the target node may be determined as the activation logical address ranges.

Moreover, logical address ranges indicated by consecutive nodes in the activation candidate list by a set logical address range count may be determined as the activation logical address ranges. The target node may be included in the consecutive nodes.

The operating method of the memory controller 120 may include transmitting information indicating the activation logical address range to the host HOST (S1830).

The operating method of the memory controller 120 may further include determining whether a logical address range corresponding to command received from the host satisfies the activation candidate condition.

In this case, the determining whether the logical address range satisfies the activation candidate condition may include determining whether the size ratio of memory regions storing valid data among memory regions indicated by a whole of the logical address range corresponding to the command received from the host HOST is greater than or equal to a set threshold rate.

The determining whether the logical address range satisfies the activation candidate condition may include determining whether a node indicating a logical address range corresponding to the command received from the host HOST is included in the activation candidate list.

The operating method of the memory controller 120 may further include inserting, into the activation candidate list, the node indicating the logical address range satisfying the activation candidate condition.

The node indicating the logical address range satisfying the activation candidate condition may be inserted at the end of the activation candidate list.

Moreover, the operating method of the memory controller 120 may further include determining whether data is updated in one or more memory regions indicated by the logical address range indicated by an update node which is one of the nodes included in the activation candidate list.

The operating method of the memory controller 120 may further include deleting the update node from the activation candidate list when data is updated in the memory regions indicated by the logical address range indicated by the update node.

The operating method of the memory controller 120 may further include reinserting the update node into the activation candidate list.

Figure 19:
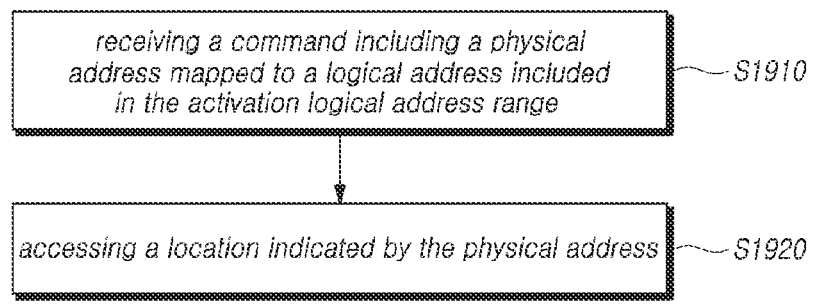
FIG. 19 illustrates an operation in which the memory controller accesses a location indicated by a physical address according to embodiments of the present disclosure.

FIG. 19 illustrates an operation in which the memory controller 120 accesses a location indicated by a physical address according to embodiments of the present disclosure.

Referring to FIG. 19, the operating method of the memory controller 120 may further include receiving a command including a physical address mapped to a logical address included in the activation logical address range from the host HOST (S1910).

The operating method of the memory controller 120 may further include accessing a location indicated by the physical address (S1920).

Figure 20:
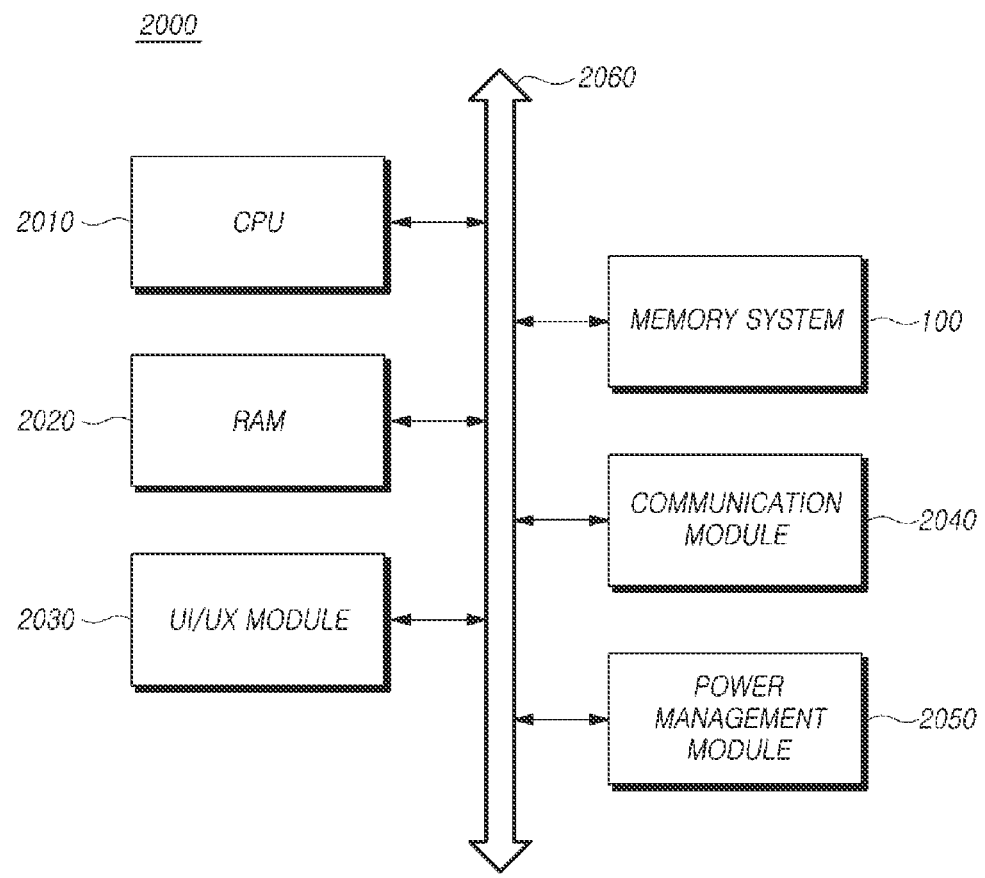
FIG. 20 is a diagram illustrating the configuration of a computing system based on embodiments of the disclosed technology.

FIG. 20 is a diagram illustrating the configuration of a computing system 2000 based on an embodiment of the disclosed technology.

Referring to FIG. 20, the computing system 2000 based on an embodiment of the disclosed technology may include: a memory system 100 electrically connected to a system bus 2060; a central processing unit (CPU) 2010 configured to control the overall operation of the computing system 2000; a random access memory (RAM) 2020 configured to store data and information related to operations of the computing system 2000; a user interface/user experience (UI/UX) module 2030 configured to provide the user with a user environment; a communication module 2040 configured to communicate with an external device as a wired and/or wireless type; and a power management module 2050 configured to manage power used by the computing system 2000.

The computing system 2000 may be a personal computer (PC) or may include a mobile terminal such as a smartphone, a tablet or various electronic devices.

The computing system 2000 may further include a battery for supplying an operating voltage, and may further include an application chipset, a graphic-related module, a camera image processor, and a dynamic random access memory (DRAM). Other elements that may be included would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A memory controller comprising:
a memory configured to store an activation candidate list including two or more nodes each indicating a logical address range that satisfies a preset activation candidate condition among a plurality of logical address ranges; and
a processor configured to:
determine a target node based on an activation parameter of logical address ranges indicated by respective nodes included in the activation candidate list,
determine, as activation logical address ranges, one or more logical address ranges from the activation candidate list based on the target node, and
transmit information indicating the activation logical address range to a host.

2. The memory controller of claim 1, wherein the processor is further configured to access, when a command received from the host includes a physical address mapped to a logical address within the activation logical address range, a location indicated by the physical address.

3. The memory controller of claim 1, wherein the activation parameter is a read count for each logical address range indicated by a corresponding node of the nodes included in the activation candidate list respectively.

4. The memory controller of claim 3, wherein the processor determines the target node by:
increasing, when receiving a read command from the host, the read count of a logical address range corresponding to the read command, and
determining a node indicating a logical address range in which the read count is equal to or greater than a set threshold count among the nodes included in the activation candidate list as the target node.

5. The memory controller of claim 1,
wherein a front node and a next node of the target node are included in the activation candidate list, and
wherein the processor determines, as the activation logical address ranges, logical address ranges indicated by the target node, the front node, and the next node.

6. The memory controller of claim 1, wherein the processor determines, as the activation logical address ranges, logical address ranges indicated by a predetermined logical address range count of consecutive nodes including the target node within the activation candidate list.

7. The memory controller of claim 1, wherein the processor is further configured to insert, when a logical address range corresponding to a command received from the host satisfies the activation candidate condition, a node indicating the logical address range corresponding to the command received from the host into the activation candidate list.

8. The memory controller of claim 7, wherein the processor inserts the node indicating the logical address range corresponding to the command received from the host and satisfying the activation candidate condition at an end of the activation candidate list.

9. The memory controller of claim 1, wherein the activation candidate condition is satisfied when a size ratio of memory regions storing valid data among memory regions indicated by a whole of the logical address range corresponding to the command received from the host is greater than or equal to a set threshold rate, and a node indicating the logical address range corresponding to the command received from the host is not included in the activation candidate list.

10. The memory controller of claim 1, wherein the processor is further configured to:
   delete, when data is updated in one or more memory regions indicated by the logical address range indicated by an update node which is one of the nodes included in the activation candidate list, the update node from the activation candidate list, and
   reinsert the update node into the activation candidate list.

11. An operating method of a memory controller, the operating method comprising:
   determining a target node based on an activation parameter of logical address ranges indicated by respective nodes included in an activation candidate list including two or more nodes each indicating a logical address range that satisfies a preset activation candidate condition among a plurality of logical address ranges;
   determining, as activation logical address ranges, one or more logical address ranges from the activation candidate list based on the target node; and
   transmitting information indicating the activation logical address ranges to a host.

12. The operating method of claim 11, further comprising:
   receiving, from the host, a command including a physical address mapped to a logical address within the activation logical address range; and
   accessing a location indicated by the physical address.

13. The operating method of claim 11, wherein the activation parameter is a read count for each logical address range indicated by a corresponding node of the nodes included in the activation candidate list respectively.

14. The operating method of claim 13, wherein the determining the target node comprises:
   receiving a read command from the host;
   increasing the read count of a logical address range corresponding to the read command; and
   determining a node indicating a logical address range in which the read count is equal to or greater than a set threshold count among the nodes included in the activation candidate list as the target node.

15. The operating method of claim 11,
   wherein a front node and a next node of the target node are included in the activation candidate list, and
   wherein logical address ranges indicated by the target node, the front node, and the next node are determined as the activation logical address ranges.

16. The operating method of claim 11, wherein logical address ranges indicated by a predetermined logical address range count of consecutive nodes including the target node within the activation candidate list are determined as the activation logical address ranges.

17. The operating method of claim 11, further comprising inserting, when a logical address range corresponding to a command received from the host satisfies the activation candidate condition, a node indicating the logical address range corresponding to the command received from the host into the activation candidate list.

18. The operating method of claim 17, wherein the node indicating the logical address range corresponding to the command received from the host and satisfying the activation candidate condition is inserted at an end of the activation candidate list.

19. The operating method of claim 11, wherein the activation candidate condition is satisfied when a size ratio of memory regions storing valid data among memory regions indicated by a whole of the logical address range corresponding to the command received from the host is greater than or equal to a set threshold rate and when a node indicating the logical address range corresponding to the command received from the host is not included in the activation candidate list.

20. The operating method of claim 11, further comprising:
   determining whether data is updated in one or more memory regions indicated by the logical address range indicated by an update node which is one of the nodes included in the activation candidate list;
   deleting the update node from the activation candidate list when the data is updated in the memory regions indicated by the logical address range indicated by the update node, and
   reinserting the update node into the activation candidate list.

* * * * *